US012564203B2

(12) United States Patent　　(10) Patent No.: US 12,564,203 B2
Kim et al.　　(45) Date of Patent: Mar. 3, 2026

(54) COATING COMPOSITION COMPRISING pH-SENSITIVE POLYMER

(71) Applicant: CJ CHEILJEDANG CORPORATION, Seoul (KR)

(72) Inventors: Jieun Kim, Seoul (KR); Jeongsu Kim, Seoul (KR); Sora Noh, Seoul (KR); Sook Hee Ku, Seoul (KR); Jinseung Park, Seoul (KR); Jun Ok Moon, Seoul (KR); Shin-ae Park, Seoul (KR); Changyub Oh, Seoul (KR); Sung Ki Bang, Seoul (KR); In Sik Son, Seoul (KR); Jin Woo Choi, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 341 days.

(21) Appl. No.: 18/026,394

(22) PCT Filed: Nov. 23, 2021

(86) PCT No.: PCT/KR2021/017312

§ 371 (c)(1),
(2) Date: Mar. 15, 2023

(87) PCT Pub. No.: WO2022/108425

PCT Pub. Date: May 27, 2022

(65) Prior Publication Data

US 2023/0337700 A1　Oct. 26, 2023

(30) Foreign Application Priority Data

Nov. 23, 2020　(KR) ........................ 10-2020-0157747

(51) Int. Cl.
| | |
|---|---|
| *A23K 20/142* | (2016.01) |
| *A23K 20/158* | (2016.01) |
| *A23K 40/25* | (2016.01) |
| *A23K 40/35* | (2016.01) |
| *A23K 50/10* | (2016.01) |

(52) U.S. Cl.
CPC .......... *A23K 20/142* (2016.05); *A23K 20/158* (2016.05); *A23K 40/25* (2016.05); *A23K 40/35* (2016.05); *A23K 50/10* (2016.05)

(58) Field of Classification Search
CPC ..... A23K 20/142; A23K 20/158; A23K 50/10
USPC .......................................................... 426/2
See application file for complete search history.

(56) References Cited

U.S. PATENT DOCUMENTS

| | | | | | |
|---|---|---|---|---|---|
| 4,832,967 | A | * | 5/1989 | Autant | A61K 9/5073 426/310 |
| 5,028,689 | A | * | 7/1991 | Heinz | C08G 69/20 528/480 |
| 5,296,219 | A | * | 3/1994 | Ardaillon | A61K 9/5026 523/105 |
| 6,034,204 | A | * | 3/2000 | Mohr | C11D 1/83 528/289 |
| 6,777,527 | B1 | * | 8/2004 | Mohr | C08G 69/10 528/332 |
| 7,070,798 | B1 | * | 7/2006 | Michal | A61L 31/10 424/484 |
| 7,786,240 | B2 | * | 8/2010 | Bruchmann | C08G 83/005 528/328 |
| 8,920,829 | B2 | * | 12/2014 | Hargrove | A23K 50/10 426/303 |
| 2005/0186685 | A1 | * | 8/2005 | Kange | B01L 3/0241 436/180 |

FOREIGN PATENT DOCUMENTS

| | | |
|---|---|---|
| JP | 2003-500500 A | 1/2003 |
| JP | 2012-251126 A | 12/2012 |
| KR | 10-0192154 B1 | 6/1999 |
| WO | WO-2017099475 A1 * | 6/2017 ............... C07K 5/06 |

OTHER PUBLICATIONS

Jun Wu, L-Arginine and L-Phenylalanine Based Poly (Ester Amide)S, Their Synthesis, Characterization, Formulations and Applications as Gene Delivery Vectors and Tissue Engineering Scaffolds, Cornell University (Year: 2011).*
Stephen Wu, Rumen-stable delivery systems, Advanced Drug Delivery Reviews 28 (1997) 323-334 (Year: 1997).*
English Written Opinion PCT/KR2021/017312 (Year: 2023).*
Translation of WO 2017/099475 (Year: 2017).*
Li et al., "Dual-vectors of anti-cancer drugs and genes based on pH-sensitive micelles self-assembled from hybrid polypeptide copolymers," Journal of Materials Chemistry, 21(9):3100-3106 (2011).
Sun et al., "Oxygen Carrier Based on Hemoglobin/Poly(L-lysine)-block-poly(L-phenylalanine) Vesicles," Langmuir, 25 (24): 13726-13729 (2009).
International Search Report issued in corresponding International Patent Application No. PCT/KR2021/017312 dated Mar. 7, 2022.

* cited by examiner

*Primary Examiner* — Jennifer McNeil

(74) *Attorney, Agent, or Firm* — Morgan, Lewis & Bockius LLP

(57) ABSTRACT

The present disclosure relates to a pH-sensitive polymer with a hydrophilic amino acid, a hydrophobic amino acid, and a fatty acid, a coating composition, and a feed additive coated with the coating composition.

17 Claims, 1 Drawing Sheet

[FIG. 1]

| Degree of dissolution (observation of changes over time) | | |
|---|---|---|
| Time | Immediately after immersion | Several hours after immersion |
| pH7 | | |
| pH2 | | |

[FIG. 2]

| Degree of dissolution (observation of changes over time) | | |
|---|---|---|
| Time | Immediately after immersion | Several hours after immersion |
| pH7 | | |
| pH2 | | |

COATING COMPOSITION COMPRISING pH-SENSITIVE POLYMER

TECHNICAL FIELD

The present disclosure relates to a pH-sensitive polymer comprising a hydrophilic amino acid, a hydrophobic amino acid, and a fatty acid as monomers, a coating composition comprising the pH-sensitive polymer, and a feed additive coated with the coating composition to be protected from decomposition in the ruminant stomach.

BACKGROUND ART

All animals, particularly livestock, require adequate nutrients to grow. Amino acids are organic compounds constituting proteins, and amino acids and proteins are the building blocks of living things. Proteins are digested or decomposed to produce amino acids. Living things consume amino acids to produce proteins in order to break down food, grow, repair body tissues, and perform many other functions. Amino acids may also be used as an energy source. Such amino acids are classified into essential amino acids, non-essential amino acids, and conditional amino acids. Among these, the nine essential amino acids are "histidine", "lysine", "tryptophan", "methionine", "threonine", "valine", "leucine", "isoleucine", and "phenylalanine". These essential amino acids are not synthesized in the body and must be ingested through food. Therefore, these essential amino acids are synthesized in vitro by methods such as fermentation and then provided in the form of feed or food additives.

However, when these amino acids are administered orally to ruminants, the amino acids are destroyed in the forestomach by the action of digestive enzymes and microorganisms present in their organs. Therefore, in order for these active ingredients to be useful and beneficial to animals, it is required to protect these active ingredients with substances that allow the active ingredients to pass through the body by allowing the active ingredients to pass through the forestomach without damage and disintegrate in or after the fourth compartment, and thus be released in the intestine.

Methods for protecting amino acids in the ruminant stomach known to date include an amino acid-mineral chelation method, a method in which amino acids are coated with a pH-sensitive polymer, a method in which amino acids are coated with a lipid matrix, and the like, and commercialized products utilizing these methods include Smartamine MTM, Mepron M85, and METHIO-BY. However, the products have a disadvantage in that the prices are high because of the use of excipients and expensive coating materials. The products also have potential toxicity problems due to the use of petroleum-derived materials.

DISCLOSURE

Technical Problem

As a result of intensive research efforts to discover a coating composition for preventing active ingredients such as amino acids from decomposing in the ruminant stomach, the present applicants have confirmed that an amino acid polymer comprising a hydrophilic amino acid, a hydrophobic amino acid, a fatty acid, and optionally a chain extender at a predetermined molar ratio exhibits pH sensitivity that the amino acid polymer is not soluble at neutral pH but is selectively soluble in an acidic solution at about pH 2, and it is thus possible to provide a feed additive protected from decomposition in the ruminant stomach by coating particles comprising an active ingredient with a coating composition comprising the amino acid polymer, and thus completed the present disclosure.

Technical Solution

An object of the present disclosure is to provide a pH-sensitive polymer comprising a hydrophilic amino acid, a hydrophobic amino acid, and a fatty acid as monomers.

Another object of the present disclosure is to provide a coating composition for protection from decomposition in the ruminant stomach, comprising the pH-sensitive polymer, a fatty acid, and cellulose or a derivative thereof.

Still another object of the present disclosure is to provide a feed additive coated to be protected from decomposition in the ruminant stomach, comprising a core particle comprising an active ingredient; and a coating layer formed on the core particle using the coating composition.

Advantageous Effects

The pH-sensitive amino acid polymer of the present disclosure comprises a hydrophilic amino acid, a hydrophobic amino acid, and a fatty acid at a predetermined ratio, thus is hardly soluble under neutral conditions but is selectively decomposed under strong acid conditions of about pH 2 as its solubility rapidly increases, and can be usefully used as a material for rumen-protected coating of feed additives for ruminants.

BRIEF DESCRIPTION OF DRAWINGS

FIG. 1 is a diagram illustrating the results of confirming the degree of dissolution of a pH-sensitive amino acid polymer according to an embodiment of the present disclosure with the naked eye; and FIG. 2 is a diagram illustrating the results of confirming the degree of dissolution of a pH-sensitive amino acid polymer according to an embodiment of the present disclosure with the naked eye.

DETAILED DESCRIPTION OF THE INVENTION

Each description and embodiment disclosed in this disclosure may also be applied to other descriptions and embodiments. That is, all combinations of various elements disclosed in this disclosure fall within the scope of the present disclosure. Further, the scope of the present disclosure is not limited by the specific description below.

An aspect of the present disclosure provides a pH-sensitive polymer comprising a hydrophilic amino acid, a hydrophobic amino acid, and a fatty acid as monomers.

As used herein, "hydrophilic amino acid" is an amino acid having a relatively high solubility in water and tends to be located mainly outside the three-dimensional structure of a protein and come into contact with an aqueous environment. The degree of hydrophilicity of an amino acid may be quantitatively expressed as a numerical value called the hydropathy index proposed by Jack Kyte and Russell F. Doolittle. This quantifies the degree of hydrophilicity (hydrophobicity) of an amino acid, and for example, arginine and lysine, which are the most hydrophilic, have values of −4.5 and −3.9, respectively.

The hydrophilic amino acid used in the pH-sensitive polymer according to the present disclosure may be one or more selected from the group consisting of lysine, arginine, glutamic acid, aspartic acid, glutamine, asparagine, and histidine. For example, lysine, arginine or a combination of both lysine and arginine may be used, but the hydrophilic amino acid is not limited thereto. In this case, the content of the hydrophilic amino acid may be 50 mol % to 75 mol % with respect to the total monomers comprised in the pH-sensitive polymer of the present disclosure, but is not limited thereto.

As used herein, "hydrophobic amino acid" is an amino acid having a relatively low solubility in water, and is involved in van der Waals interactions and contributes to the stabilization of protein cores. The degree of hydrophobicity of an amino acid, as the degree of hydrophilicity, may be quantitatively expressed as a numerical value called the hydropathy index. This quantifies the degree of hydrophobicity (hydrophilicity) of an amino acid, and for example, isoleucine and valine, which are the most hydrophobic, have values of 4.5 and 4.2, respectively.

The hydrophobic amino acid used in the pH-sensitive polymer according to the present disclosure may be one or more selected from the group consisting of phenylalanine, tryptophan, isoleucine, leucine, valine, alanine, methionine, cysteine, and tyrosine. The hydrophobic amino acid may be, for example, one or more selected from the group consisting of phenylalanine, tryptophan, valine, and tyrosine, but is not limited thereto. In this case, the content of the hydrophobic amino acid may be 10 mol % to 35 mol % with respect to the total monomers comprised in the pH-sensitive polymer of the present disclosure, but is not limited thereto.

As used herein, the term "fatty acid" refers, in chemistry, particularly in biochemistry, to a carboxylic acid having an unsaturated or saturated long aliphatic chain, and is an amphoteric substance and its structure may be divided into a hydrophilic and water-soluble polar head group and a hydrophobic and water-insoluble nonpolar tail group. A fatty acid is a weakly acidic substance, so the change in $pK_a$ depending on the length of aliphatic chain is not large. Most naturally occurring fatty acids have an unbranched hydrocarbon chain of an even number of carbon atoms, from 4 to 28. Fatty acids generally exist in the form of three main classes of esters: triglycerides, phospholipids, and cholesteryl esters, rather than as standalone forms in living organisms. However, the fatty acid comprised in the pH-sensitive amino acid polymer of the present disclosure may be comprised in the form of a free fatty acid rather than in the form of these esters.

For example, the fatty acid may be a fatty acid having 12 to 18 carbon atoms. Specifically, the fatty acid may be one or more selected from the group consisting of stearic acid, palmitic acid, and lauric acid, but is not limited thereto.

In this case, the fatty acid may be comprised at 5 mol % to 20 mol % with respect to the total monomers comprised in the pH-sensitive polymer of the present disclosure, but is not limited thereto.

As used herein, the term "chain extender" refers to a small molecule having two or more functional groups, for example, a hydroxyl group, an amine group, or a carboxyl group, in one molecule, and may be added to a polymerization reaction for the purpose of forming a polymer having a high molecular weight by linking monomer to monomer in polymer polymerization.

When it is taken into consideration that a hydrophilic amino acid having a large number of amine groups is comprised in the polymer, the chain extender used in the pH-sensitive polymer according to the present disclosure may be glutamic acid or aspartic acid having two carboxyl groups or a combination of both glutamic acid and aspartic acid so as to be advantageous in condensation reaction with the hydrophilic amino acid, but is not limited thereto.

In this case, the chain extender may be comprised at 0 mol % to 15 mol % with respect to the total monomers comprised in the pH-sensitive polymer of the present disclosure. The chain extender may be comprised at, for example, 2 mol % to 15 mol %, 3 mol % to 13 mol %, or 5 mol % to 12 mol %, but the content is not limited thereto.

The content ratio of the hydrophilic amino acid, hydrophobic amino acid, fatty acid, and optionally chain extender comprised in the pH-sensitive polymer of the present disclosure may be adjusted in consideration of polymerization and/or pH sensitivity of the polymer, and the like.

As used herein, the term "pH sensitivity" refers to a state of selectively exhibiting predetermined properties in a specific pH range. For example, a pH-sensitive polymer may swell or collapse or its properties may change in various ways as the pH of the surrounding medium changes. Such pH-sensitive polymers are also used in controlled drug delivery systems, biomimetics, micromechanical systems, separation processes, surface functionalization and the like. As an example, the pH-sensitive polymer of the present disclosure is hardly soluble in neutral conditions of about pH 7 similar to the environment in the ruminant stomach, but has a significantly excellent solubility under strongly acidic conditions of about pH 2 similar to the environment in the fourth compartment.

Another aspect of the present disclosure provides a coating composition comprising the pH-sensitive polymer, a fatty acid, and cellulose or a derivative thereof.

The coating composition may be applied to a feed additive or the like to provide a coating for protection of an active ingredient comprised in the feed additive or the like from decomposition in the ruminant stomach.

As used herein, "cellulose" is the most abundant polysaccharide existing in nature, and is a linear polymer composed of 6-membered ether rings (D-glucose or dextrose) covalently linked to each other by ether groups called glycosidic bonds. Cellulose and its derivatives may be regarded as condensation polymers since they are usually composed of thousands of glucose repeating units and produce glucose molecules by hydrolysis. A derivative of cellulose refers to a substance in which some or all of hydrogen atoms of the hydroxyl groups present in glucose, which is a monomer constituting the cellulose, are substituted with substituents. Derivatives of cellulose such as ester cellulose, ether cellulose, and nitrocellulose (cellulose nitrate, celluloid) in which the substituent is alkylcarbonyl, alkyl, and nitro, respectively, are commercially available. For example, the cellulose or derivative thereof comprised in the coating composition of the present disclosure may be one or more selected from the group consisting of cellulose itself and ethyl cellulose and methyl cellulose, which are ether derivatives of cellulose, but is not limited thereto.

As used herein, "ruminant stomach" is the stomach of animals of mammalian order Artiodactyla, and is also referred to as stomach for rumination. Since herbivores mainly ingest coarse feed, some parts of the digestive system are particularly developed. For example, horses and rabbits have developed cecum and colon, but cows and goats have particularly developed stomachs, forming the ruminant stomach, which accounts for about 70% of the entire digestive system. The volume is also large, and the gastric volume of a cow is 200 L whereas the gastric volume of a pig or horse, which is a monogastric, is 6 L to 15 L. The ruminant stomach is divided into four compartments: rumen of the first compartment, reticulum of the second compartment, omasum of the third compartment, and abomasum of the fourth compartment. The rumen and reticulum are the modified esophagus, and the omasum and abomasum correspond to the original stomach. The rumen is particularly large, accounting for 80% of the entire stomach, and the lining of the rumen wall is covered in countless papillae. Meanwhile, the mucous membrane of the reticulum is ridged like a honeycomb, the omasum has a large number of papillae and ridges, and the abomasum has large ridges, 13 to 15 in goats and 16 in cows. These four compartments communicate with each other, and the digestion process in the ruminant stomach is as follows: coarsely chewed food is sent to the reticulum through the rumen, then is agglomerated in the reticulum, is sent back to the mouth, undergoes the ruminating process, then enters the omasum, crushed into small pieces in the omasum, and digested in the abomasum. At this time, the stomach that secretes digestive juices is only the abomasum of the fourth compartment, but coarse fibers are fermented by the action of microorganisms in the rumen.

Still another aspect provides a feed additive coated to be protected from decomposition in the ruminant stomach, comprising a core particle comprising an active ingredient; and a coating layer formed on the core particle using the coating composition.

The active ingredient used in the feed additive of the present disclosure may be amino acids, enzymes, probiotics, prebiotics, bacteriophages, vitamins, organic acids, or mixtures thereof, but is not limited thereto.

Furthermore, the feed additive of the present disclosure may be for ruminants, but is not limited thereto.

As used herein, the term "ruminants" refers to animals that have a ruminant stomach and perform rumination, and are herbivorous mammals, also known as ruminating animals. Animals of mammalian orders Artiodactyla, Camelidae, Tragulidae, Cervidae, Giraffidae, and Bovidae belong to this category. The digestion of these ruminants has two characteristics: rumination and decomposition of food by microorganisms. When a monogastric ingests food, the monogastric mix the with saliva, crushed the food into small pieces, and swallow the small pieces, but a ruminant does not have front teeth, so chews the food roughly with their tongue and lips, and swallow the roughly chewed food, and then ruminate the roughly chewed food for digestion. It is considered that this rumination is mainly performed at night because ruminants often become food for carnivores, so eat a large amount of food in a given time, store the food, and then slowly digest the food in a safe place. As described above, there are several types of microorganisms, which ferment food, in the first compartment, namely the rumen of ruminants, and these microorganisms are digested and absorbed after being decomposed in the fourth compartment together with the food, and become nutrients necessary for ruminants.

In the feed additive of the present disclosure, the coating layer is not decomposed in the ruminant stomach at pH 6 to pH 8, but is selectively decomposed in the fourth compartment at pH 3 or less to release the active ingredient.

As in other animals, in the case of ruminants as well, it is necessary to provide nutrients such as essential amino acids in addition to feed in order to promote growth or impart functionality. However, when the nutrients are supplied as ingredients that have not been specially treated, a significant amount thereof is decomposed through a series of ruminations, such as being decomposed by microorganisms in the rumen, and the nutrients are not delivered to the fourth compartment, where digestive enzymes work, or the small intestine, where the nutrients are absorbed, but are easily lost. Therefore, a feed additive in which the active ingredient is coated with a coating composition comprising the pH-sensitive polymer according to the present disclosure may be suitable as a formulation for supplying amino acids to ruminants since the feed additive is not decomposed under neutral conditions as in the rumen but is selectively decomposed under strongly acidic conditions similar to the environment in the fourth compartment to elute the active ingredient.

EXAMPLES

Hereinafter, the present disclosure will be described in more detail with reference to the following Examples. However, the following Examples are only for exemplifying the present disclosure, and the scope of the present disclosure is not limited to these only.

Experimental Example 1: Preparation of pH-Sensitive Amino Acid Polymer

Experimental Example 1-1: Preparation of pH-Sensitive Amino Acid Polymer

A pH-sensitive amino acid polymer was prepared by thermal condensation polymerization using a hydrophilic amino acid and a hydrophobic amino acid as monomers. Specifically, a hydrophilic amino acid and a hydrophobic amino acid were put into a reactor equipped with a stirrer and a condenser, and then stirred and reacted while the temperature was raised to 185° C. Condensate water generated at this time was removed through the condenser. At the time point at which condensate water was not generated any longer, the pressure was reduced, and stirring and reaction were conducted for 2 to 3 hours in a vacuum state. After completion of the reaction, the contents were discharged to obtain the title polymer.

Experimental Example 1-2: Preparation of pH-Sensitive Amino Acid Polymer having Fatty Acid Introduced A pH-sensitive amino acid polymer into which a fatty acid was introduced was prepared by thermal condensation polymerization using a hydrophilic amino acid, a hydrophobic amino acid, and a fatty acid as monomers. Specifically, similarly to in Experimental Example 1-1, condensate water generated during the reaction of the hydrophilic amino acid with the hydrophobic amino acid was removed through the condenser. At the time point at which condensate water was not generated any longer, the fatty acid was put into the reactor, then the pressure was reduced, and the mixture was stirred and reacted for 2 to 3 hours in a vacuum state. After completion of the reaction, the contents were discharged to obtain the title polymer.

Experimental Example 2: Preparation of Methionine Formulation Coated to be Protected from Decomposition in Ruminant Stomach

Experimental Example 2-1: Preparation of Methionine Core

Methionine, an active ingredient, and polylysine, a binder, were mixed with water, and the mixture was extruded using a double-screw extruder (L/D=15, screw diameter: 100 mm). The temperature of the extruder was set to room temperature, and a speed of 0.1 ton/d was maintained. The extrudate was formed into a spherical or cylindrical methionine core having a particle diameter of 2.3 mm to 2.8 mm using a conventional spheronizer.

Experimental Example 2-2: Coating for Protection from Decomposition in Ruminant Stomach A coating composition was prepared by dissolving the pH-sensitive amino acid polymer into which a fatty acid was not or was introduced prepared according to Experimental Example 1-1 or 1-2, ethyl cellulose, and stearic acid in an aqueous solution of ethanol at 65° C. The methionine core prepared according to Experimental Example 2-1 was put into a cylindrical pan coater and the previously prepared coating composition was sprayed at a rate of 4 ml/min. The coated formulation was dried at room temperature.

Experimental Example 3: Preparation of Histidine Formulation Coated to be Protected from Decomposition in Ruminant Stomach

Experimental Example 3-1: Preparation of Histidine Core

A spherical or cylindrical histidine core was prepared in the same manner as in Experimental Example 2-1 except that histidine in the form of a hydrochloride or free form was used as an active ingredient instead of methionine, and defatted soybean powder and stearic acid were additionally comprised as excipients.

Experimental Example 3-2: Coating for Protection from Decomposition in Ruminant Stomach The pH-sensitive amino acid polymer was coated in the same manner as in Experimental Example 2-2, except that the histidine core prepared according to Experimental Example 3-1 was used instead of the methionine core.

Experimental Example 4: Evaluation of Bioavailability

Experimental Example 4-1: Evaluation of In Situ Ruminal Bypass

The formulations coated to be protected, which were prepared according to Experimental Examples 2 and 3, were placed and sealed in a nylon bag (R510 from ANKOM Technology). This was incubated in the ruminant stomach of three rumen-cannulated Holstein castrates (weight: around 630 kg to 650 kg). After the experiment was completed, the nylon bag was washed with water and dried, and the DM and active ingredient contents were measured to compare the relative residual amounts.

Experimental Example 4-2: Evaluation of In Vitro Digestion and Decomposition The ruminant stomach and small intestine were simulated by sequentially treating the prepared formulations with pepsin, pancreatin, and lipase in phosphate buffer conditions. Specifically, the pH was adjusted to 2 by adding 1 M HCl to 0.1 M $KH_2PO_4$ buffer, and then a 25 mg/mL pepsin solution was added. A nylon bag (F57 from ANKOM Technology) in which the sample underwent the evaluation of ruminal bypass was placed and sealed was put into the solution, mixed, then sealed, and incubated in an incubator (DaisyII from ANKOM Technology) at 39° C. After 2 hours, 0.5 L of 0.2 M $KH_2PO_4$ was added, the pH was adjusted to 7.8 with 1 M NaOH, and a 10 mg/mL pancreatin solution was added, followed by incubation at 39° C. After the experiment was completed, the nylon bag was washed with water and dried, and the contents of DM and active ingredient were measured.

Experimental Example 4-3: Calculation of Bioavailability

The ruminal bypass rate was calculated as the ratio of the residual sample after the ruminal bypass evaluation to the sample before the experiment, and the digestion and decomposition rate was calculated as the ratio of the active ingredient lost to the active ingredient before evaluation of digestion and decomposition. The bioavailability was calculated from these values using the following equation:

Bioavailability (%)=ruminal bypass rate×digestion and decomposition rate×active ingredient content (%).

Example 1: Analysis of Physical Properties of pH-Sensitive Amino Acid Polymer Further Comprising Chain Extender A pH-sensitive amino acid polymer was prepared according to Experimental Example 1-1 except that a chain extender was further comprised, and the physical properties thereof were measured and are shown in Table 1 below. At this time, lysine as a hydrophilic amino acid, phenylalanine and tryptophan as hydrophobic amino acids, and glutamic acid as a chain extender were used at the ratios shown in Table 1 below to synthesize five types of polymers (polymers A to E).

Specifically, the weight average molecular weight and molecular weight distribution were analyzed using a gel permeation chromatography system (GPC, Waters) equipped with a refractive index detector (RID). At this time, polystyrene was used as the standard substance. Meanwhile, the heat capacity depending on the temperature was measured from −20° C. to 280° C. in a nitrogen atmosphere using a differential scanning calorimeter (DSC, TA Instruments Q20) to calculate the melting temperature ($T_m$), crystallization temperature ($T_c$), and glass transition temperature ($T_g$). Furthermore, the pH sensitivity was confirmed by immersing the polymers in 0.1 M phosphate buffer ($KH_2PO_4$) at pH 2 and pH 7 at a concentration of 20 g/L and observing their changes over time. Each result is shown in Table 1 below, and the changes over time depending on the pH, which have been confirmed with the naked eye, are illustrated in FIG. 1.

TABLE 1

| | Molar ratio of monomers (%) | | | | | | Measurement of physical properties | | |
| | Hydrophilic amino acid | Hydrophobic amino acids | | Chain extender | T$_g$ | Mw | PDI | Degree of dissolution (observation of changes over time) | |
| Polymer | Lys | Phe | Trp | Glu | (° C.) | (g/mol) | (Mw/Mn) | pH 2 | pH 7 |
|---|---|---|---|---|---|---|---|---|---|
| A | 50 | 25 | 25 | 0 | 87 | 5,200 | 1.7 | Δ | x |
| B | 37.5 | 25 | 37.5 | 0 | 93 | 3,800 | 1.4 | Δ | x |
| C | 57.5 | 27.5 | 10 | 5 | 85 | 11,300 | 2.8 | • | x |
| D | 60 | 29 | 11 | 0 | 68 | 5,800 | 1.8 | ○ | x |
| E | 60 | 10 | 20 | 10 | 105 | 23,400 | 4.4 | • | x |

* Degree of dissolution x: not dissolved, Δ: partially dissolved, ○: relatively well dissolved, •: significantly well dissolved As shown in Table 1, the microstructures of the pH-sensitive amino acid polymers prepared by varying the ratio of hydrophilic amino acid, hydrophobic amino acid and chain extender were measured using a differential scanning calorimeter, and it was confirmed that the pH-sensitive amino acid polymers had amorphous structures. When the solubilities of the pH-sensitive amino acid polymers were compared by observing the changes over time, stronger pH sensitivity was expressed in a case where the content of lysine as a hydrophilic amino acid was as high as 57 mol % or more, and/or in a case where a chain extender was comprised.

Example 2: Analysis of Physical Properties of pH-Sensitive Amino Acid Polymer Further Comprising Chain Extender Similarly to in Example 1, the physical properties of the pH-sensitive amino acid polymers prepared by further comprising a chain extender were measured and are shown in Table 2 below. At this time, lysine as a hydrophilic amino acid, phenylalanine or tryptophan as hydrophobic amino acids, and glutamic acid as a chain extender were used at the ratios shown in Table 2 below to synthesize four types of polymers (polymers F to I).

TABLE 2

| | Molar ratio of monomers (%) | | | | Measurement of physical properties | | |
| | Hydrophilic amino acid | Hydrophobic amino acids | | Chain extender | T$_g$ | Mw | PDI |
| Polymer | Lys | Phe | Trp | Glu | (° C.) | (g/mol) | (Mw/Mn) |
|---|---|---|---|---|---|---|---|
| F | 57.5 | 0 | 37.5 | 5 | 105 | 6,400 | 1.7 |
| G | 65 | 0 | 25 | 10 | 120 | 73,500 | 11.9 |
| H | 57.5 | 37.5 | 0 | 5 | 75 | 10,200 | 2.9 |
| I | 60 | 30 | 0 | 10 | 91 | 13,200 | 3.7 |
| C | 57.5 | 27.5 | 10 | 5 | 85 | 11,300 | 2.8 |
| G | 60 | 10 | 20 | 10 | 105 | 23,400 | 4.4 |

As shown in Table 2, the microstructures of the pH-sensitive amino acid polymers prepared by varying the ratio of hydrophilic amino acid, hydrophobic amino acid and chain extender were measured using a differential scanning calorimeter, and it was confirmed that the pH-sensitive amino acid polymers had amorphous structures.

In addition, the degree of dissolution depending on the pH was confirmed by observing changes over time of the polymers G and H selected from the polymers, and the results are shown in Table 3 below and FIG. 2.

TABLE 3

| | Degree of dissolution (observation of changes over time) | |
| Polymer | pH 2 | pH 7 |
|---|---|---|
| G | ● | X |
| H | ● | X |
| E | ● | X |

*Degree of dissolution

X: not dissolved,

Δ: partially dissolved,

○: relatively well dissolved,

●: significantly well dissolved

As shown in Table 3 and FIG. 2, all of the polymers prepared by comprising a hydrophilic amino acid, a hydrophobic amino acid, and a chain extender at controlled ratios exhibited strong pH sensitivity regardless of the type of hydrophobic amino acid.

Example 3: Analysis of Physical Properties of pH-Sensitive Amino Acid Polymer having Fatty Acid Introduced A pH-sensitive amino acid polymer into which a fatty acid was introduced was prepared according to Experimental Example 1-2 except that a chain extender was further comprised, and the physical properties thereof were measured and are shown in Table 4 below. At this time, lysine as a hydrophilic amino acid, phenylalanine and/or tryptophan as hydrophobic amino acids, glutamic acid as a chain extender, and stearic acid as a fatty acid were used at the ratios shown in Table 4 below to synthesize five types of polymers (polymers J to N).

Specifically, as in Example 1, the weight average molecular weight, molecular weight distribution, melting temperature ($T_m$), and glass transition temperature ($T_g$) were calculated. Furthermore, the pH sensitivity was confirmed by observing changes over time of the polymers in solutions at pH 2 and pH 7. Each result is shown in Table 4 below.

Example 4: Evaluation of pH Sensitivity Depending on Type of Fatty Acid pH-sensitive amino acid polymers into which fatty acids were introduced were prepared according to Experimental Example 1-2 except that two different types of fatty acids were used in polymerization and glutamic acid as a chain extender was further comprised. At this time, the ratio of the respective monomers was adjusted to be the same as that in

TABLE 4

| | | | | | | Measurement of physical properties | | | | | |
|---|---|---|---|---|---|---|---|---|---|---|---|
| | Molar ratio of monomers (%) | | | | | | | | | Degree of dissolution | |
| | Hydrophilic amino acid | Hydrophobic amino acid | | Chain extender | Fatty acid | $T_m$ | $T_g$ | Mw | PDI | (observation of changes over time) | |
| Polymer | Lys | Phe | Trp | Glu | SA | (° C.) | (° C.) | (g/mol) | (Mw/Mn) | pH 2 | pH 7 |
| Stearic acid | — | — | — | — | 100 | 69 | — | — | — | — | — |
| J | 66 | 1.7 | 24.3 | 8 | 0 | — | 96 | 22,000 | 6.1 | • | Δ |
| K | 62 | 0 | 19 | 9 | 10 | — | 83 | 27,000 | 5.4 | • | x |
| L | 62 | 10 | 20 | 8 | 0 | — | 91 | 12,000 | 4.0 | • | x |
| M | 60.8 | 4.4 | 14.2 | 11.8 | 8.8 | — | 97 | 72,000 | 14.0 | ○ | x |
| N | 60 | 4.5 | 14.5 | 9 | 12 | — | 79.7 | 20,000 | 6.0 | • | x |

* Degree of dissolution
x: not dissolved, Δ: partially dissolved, ○: relatively well dissolved, •: significantly well dissolved As shown in Table 4, the melting temperature found in a pure fatty acid was not observed in pH-sensitive amino acid polymers into which the fatty acid was introduced as a monomer, and this indicates that the fatty acid exists in the polymer chain in the form of a covalent bond.

Methionine formulations (hereinafter referred to as formulations a to d) coated to be protected from decomposition in the ruminant stomach were prepared according to Experimental Example 2 using the polymers J, K, L, and N in coating compositions and changing the ratios of the coating and the active ingredient, and subjected to the bioavailability evaluation according to Experimental Example 4, and the results are shown in Table 5 below. The in situ ruminal bypass was evaluated through incubation for 48 hours, and all experimental results were calculated based on the product of DM and active ingredient content.

polymer K, and $C_{18}$ stearic acid and $C_{12}$ lauric acid were used as the fatty acids. The pH sensitivity was confirmed by measuring and comparing the solubilities of the polymers prepared as described above under different pH conditions. Specifically, the polymer was dissolved at a constant concentration in 0.1 M $KH_2PO_4$ buffers corrected to pH 2 and pH 7 with hydrochloric acid and sodium hydroxide, respectively. The supernatant was taken over time and diluted 1000-fold, and the absorbance at a wavelength of 200 nm was measured using a UV/Vis spectrometer. The absorbance measured over time under each pH condition is shown in Table 6 below.

TABLE 5

| | | Bioavailability evaluation | | | | |
|---|---|---|---|---|---|---|
| Formulation | Polymer | Coating (%) | Active ingredient (%) | Bypass rate (%) | Digestion and decomposition rate (%) | Bioavailability (%) |
| a | J | 19.9 | 75.0 | 89.3 | 31.2 | 20.9 |
| b | K | 20.1 | 74.9 | 97.6 | 93.1 | 68.1 |
| c | L | 20.2 | 75.0 | 81.2 | 62.1 | 37.8 |
| d | N | 20.1 | 74.9 | 99.7 | 42.2 | 31.5 |

As shown in Table 5, in the case of coating the formulation with a polymer comprising a fatty acid compared to the case of coating the formulation with a pH-sensitive amino acid polymer having a similar composition but not comprising a fatty acid, the bypass rate was significantly improved and an improved bioavailability was expected even though the digestion and decomposition rate was slightly low.

TABLE 6

| | Fatty | Time | Absorbance | |
|---|---|---|---|---|
| Polymer | acid | (h) | pH 2 | pH 7 |
| O | Stearic | 1 | 0.199 | 0.066 |
| | acid | 2 | 0.256 | 0.067 |
| | ($C_{18}$) | 4 | 0.308 | 0.067 |

TABLE 6-continued

| Polymer | Fatty acid | Time (h) | Absorbance pH 2 | Absorbance pH 7 |
|---|---|---|---|---|
| | | 24 | 0.704 | 0.089 |
| | | 48 | 1.011 | 0.1 |
| P | Lauric acid (C₁₂) | 1 | 0.458 | 0.066 |
| | | 2 | 0.68 | 0.066 |
| | | 4 | 0.951 | 0.066 |
| | | 24 | 1.266 | 0.067 |
| | | 48 | 1.271 | 0.068 |

As shown in Table 6, the absorbance at pH 2 was higher and the absorbance at pH 7 lower in the polymer comprising lauric acid than in the polymer comprising stearic acid, which has a relatively large number of carbon atoms. However, although there was a difference in degree, both types of polymers exhibited pH sensitivity such that the polymers were hardly soluble under a neutral condition of pH 7 but had a significantly highly solubility under an acidic condition of pH 2 regardless of the type of fatty acid.

Example 5: Analysis of Physical Properties of Mass-Produced pH-Sensitive Amino Acid Polymer Having Fatty Acid Introduced The pH-sensitive amino acid polymer into which a fatty acid was introduced according to the present disclosure was mass-produced in a 50 L reactor. As monomers, lysine as a hydrophilic amino acid, tryptophan as a hydrophobic amino acid, glutamic acid as a chain extender, and stearic acid as a fatty acid were used for polymerization to synthesize three types of polymers (hereinafter, polymers Q, R, and S). The physical properties of these polymers were measured and shown in Table 7 below. At this time, polymers R and S were subjected to continuous batch polymerization. The weight average molecular weight and glass transition temperature were measured in the same manner as in Example 1. With regard to the viscosity, the relative viscosity was measure using a rotational rheometer (Rheometer, Anton Paar). In the measurement, the polymer material was placed between a shaft with a gap of 1.0 mm and a parallel plate, and the shaft was rotated at a constant shear rate while the temperature was raised at a rate of 2.5° C./min in a temperature range of 70° C. to 190° C. At this time, the relative viscosity at 150° C. was measured from the behavior of the polymer material. The melt flow index was measured at 150° C. and a load of 2160 g using a melt flow indexer (Toyoseiki) in conformity with the international standards ISO E1133 and ASTM D1238.

TABLE 7

| Polymer | Molar ratio of monomers (%) Lys | Trp | Glu | SA | $T_g$ (° C.) | Mw (g/mol) | Viscosity @150° C. (mPa · s) | Melt flow index @150° C. (mL/10 min) |
|---|---|---|---|---|---|---|---|---|
| Q | 62 | 19 | 9 | 10 | 79.4 | 10.4k | 1,829,600 | 8.6 |
| R | | | | | 81.8 | 19.7k | 2,156,300 | 5.1 |
| S | | | | | 81.4 | 20.4k | 2,914,800 | 4.8 |

Methionine formulations (hereinafter referred to as formulations e, f, and g) coated to be protected from decomposition in the ruminant stomach were prepared according to Experimental Example 2 using the polymers Q, R, and S in coating compositions, and subjected to the bioavailability evaluation according to Experimental Example 4, and the results are shown in Table 8 below. The in situ ruminal bypass was evaluated through incubation for 48 hours, and all experimental results were calculated based on the product of DM and active ingredient content.

TABLE 8

| Formulation | Polymer | Coating (%) | Active ingredient (%) | Bioavailability evaluation Bypass rate (%) | Digestion and decomposition rate (%) | Bioavailability (%) |
|---|---|---|---|---|---|---|
| e | Q | 15.2 | 78.4 | 76.1 | 99.9 | 59.6 |
| f | R | 15.9 | 77.7 | 88.5 | 94.5 | 65.0 |
| g | S | 15.8 | 77.9 | 86.4 | 96.3 | 64.8 |

Example 6: Evaluation of Bioavailability
Depending on Type of Active Ingredient

According to Experimental Examples 2 and 3, a methionine formulation coated to be protected from decomposition in the ruminant stomach, which comprised methionine as an active ingredient, and a histidine formulation coated to be protected from decomposition in the ruminant stomach, which comprised histidine as an active ingredient, were each prepared using the polymer R disclosed in Example 5 in a coating composition. The prepared formulations were three types of formulations (hereinafter referred to as formulations h, i, and j, respectively) in which the coating and the active ingredient were adjusted to be comprised at the ratios shown in Table 9 below. The bioavailability evaluation according to Experimental Example 4 was performed on these formulations, and the results are shown in Table 9 below. The in situ ruminal bypass was evaluated through incubation for 24 hours, and all experimental results were calculated based on the product of DM and active ingredient content.

TABLE 9

| | | | | Bioavailability evaluation | | |
| Formulation | Polymer | Coating (%) | Active ingredient (%) | Bypass rate (%) | Digestion and decomposition rate (%) | Bioavailability (%) |
| --- | --- | --- | --- | --- | --- | --- |
| h | Met | 15.0 | 77.7 | 100.0 | 89.6 | 69.6 |
| i | His | 18.0 | 73.3 | 94.3 | 99.8 | 69.0 |

As shown in Table 9, it was possible to achieve an excellent bioavailability regardless of the type of active ingredient by adjusting the ratio of the coating layer.

Based on the above description, it will be understood by those skilled in the art that the present disclosure may be implemented in a different specific form without changing the technical spirit or essential characteristics thereof. Therefore, it should be understood that the above embodiment is not limitative, but illustrative in all aspects. The scope of the disclosure is defined by the appended claims rather than by the description preceding them, and therefore all changes and modifications that fall within metes and bounds of the claims or equivalents of such metes and bounds are therefore intended to be embraced by the claims.

The invention claimed is:

1. A pH-sensitive polymer comprising a hydrophilic amino acid, a hydrophobic amino acid, and a fatty acid as monomers, and further comprising a chain extender.

2. The pH-sensitive polymer according to claim 1, wherein the hydrophilic amino acid is lysine, arginine, or both of lysine and arginine.

3. The pH-sensitive polymer according to claim 1, wherein the hydrophobic amino acid is one or more selected from the group consisting of phenylalanine, tryptophan, valine, and tyrosine.

4. The pH-sensitive polymer according to claim 1, wherein the fatty acid is one or more selected from the group consisting of stearic acid, palmitic acid, and lauric acid.

5. The pH-sensitive polymer according to claim 1, wherein the chain extender is glutamic acid, aspartic acid, or both of glutamic acid and aspartic acid.

6. The pH-sensitive polymer according to claim 1, wherein the hydrophilic amino acid is contained at 50 mol % to 75 mol % in total monomers.

7. The pH-sensitive polymer according to claim 1, wherein the hydrophobic amino acid is contained at 10 mol % to 35 mol % in total monomers.

8. The pH-sensitive polymer according to claim 1, wherein the fatty acid is contained at 5 mol % to 20 mol % in total monomers.

9. The pH-sensitive polymer according to claim 1, wherein the chain extender is contained at a concentration greater than 0 mol % and 15 mol % or less in total monomers.

10. A coating composition comprising a pH-sensitive polymer, a fatty acid, and cellulose or a derivative of cellulose, wherein the pH-sensitive polymer comprises a hydrophilic amino acid, a hydrophobic amino acid, and a fatty acid as monomers.

11. The coating composition according to claim 10, wherein the coating composition is for protection from decomposition in ruminant stomach.

12. The coating composition according to claim 10, wherein the fatty acid is one or more selected from the group consisting of stearic acid, lauric acid, and palmitic acid.

13. The coating composition according to claim 10, wherein the derivative of cellulose is one or more selected from the group consisting of cellulose, ethyl cellulose, and methyl cellulose.

14. A feed additive coated to be protected from decomposition in ruminant stomach, comprising a core particle comprising an active ingredient; and a coating layer formed on the core particle using the coating composition according to claim 10.

15. The feed additive according to claim 14, wherein the feed additive is for a ruminant.

16. The feed additive according to claim 14, wherein the coating layer is not decomposed in ruminant stomach at a pH of 6 to 8 but is selectively decomposed in a fourth compartment at a pH of 3 or less to release the active ingredient.

17. The coating composition according to claim 10, wherein the pH-sensitive polymer further comprises a chain extender.

* * * * *